(12) United States Patent
Burton et al.

(10) Patent No.: US 7,260,739 B2
(45) Date of Patent: Aug. 21, 2007

(54) METHOD, APPARATUS AND PROGRAM STORAGE DEVICE FOR ALLOWING CONTINUOUS AVAILABILITY OF DATA DURING VOLUME SET FAILURES IN A MIRRORED ENVIRONMENT

(75) Inventors: David Alan Burton, Vail, AZ (US); Noel Simen Otterness, Lafayette, CO (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 10/434,978

(22) Filed: May 9, 2003

(65) Prior Publication Data
US 2004/0225914 A1    Nov. 11, 2004

(51) Int. Cl.
*G06F 11/00* (2006.01)

(52) U.S. Cl. .................................. 714/6; 711/162
(58) Field of Classification Search ............. 714/6, 714/7, 8
See application file for complete search history.

(56) References Cited

U.S. PATENT DOCUMENTS

| | | | | |
|---|---|---|---|---|
| 5,544,347 A * | 8/1996 | Yanai et al. | ............... | 711/162 |
| 5,594,900 A | 1/1997 | Cohn et al. | ............... | 707/202 |
| 5,742,792 A | 4/1998 | Yanai et al. | ............... | 711/162 |
| 5,745,753 A | 4/1998 | Mosher, Jr. | ............... | 707/202 |
| 5,857,208 A | 1/1999 | Ofek | ............... | 707/204 |
| 5,889,935 A * | 3/1999 | Ofek et al. | ............... | 714/6 |
| 6,044,444 A | 3/2000 | Ofek | ............... | 711/162 |
| 6,079,029 A * | 6/2000 | Iwatani et al. | ............... | 714/6 |
| 6,092,066 A | 7/2000 | Ofek | ............... | 707/10 |
| 6,275,897 B1 | 8/2001 | Bachmat | ............... | 711/114 |
| 6,308,283 B1 | 10/2001 | Galipeau et al. | ............... | 714/6 |
| 6,324,654 B1 | 11/2001 | Wahl et al. | ............... | 714/6 |
| 6,598,134 B2 * | 7/2003 | Ofek et al. | ............... | 711/162 |
| 6,810,491 B1 * | 10/2004 | Yamamoto et al. | ............... | 714/7 |
| 6,931,499 B2 * | 8/2005 | Delaney et al. | ............... | 711/154 |
| 6,941,490 B2 * | 9/2005 | Ohran | ............... | 714/15 |
| 2003/0172316 A1 * | 9/2003 | Tremblay et al. | ............... | 714/7 |
| 2003/0182525 A1 * | 9/2003 | O'Connell et al. | ............... | 711/162 |
| 2004/0153717 A1 * | 8/2004 | Duncan | ............... | 714/5 |
| 2004/0250161 A1 * | 12/2004 | Patterson | ............... | 714/6 |
| 2005/0086558 A1 * | 4/2005 | Tomita | ............... | 714/6 |
| 2005/0097391 A1 * | 5/2005 | Boyd et al. | ............... | 714/6 |

OTHER PUBLICATIONS

Zhou, et al., "Fast Cluster Failover Using Virtual Memory-Mapped Communication", Proceedings of the 1999 Conference on Supercomputing, pp. 373-382.

* cited by examiner

*Primary Examiner*—Robert W Beausoliel, Jr.
*Assistant Examiner*—Christopher McCarthy
(74) *Attorney, Agent, or Firm*—David W. Lynch; Chambliss, Bahner & Stophe (57) ABSTRACT

A method, apparatus and program storage device for allowing continuous availability of data during volume set failures in a mirrored environment. Continuous servicing of input/output request for a volume set having failed on a primary array using either portions of the failed volume set or a mirrored volume set is provided. A determination is made whether the failed volume set can service the input/output request and continuous data availability is provided by using the failed volume set to process the input/output request when the failed volume set can service the input/output request, else using a remote mirrored volume set to process the input/output request.

29 Claims, 4 Drawing Sheets

METHOD, APPARATUS AND PROGRAM STORAGE DEVICE FOR ALLOWING CONTINUOUS AVAILABILITY OF DATA DURING VOLUME SET FAILURES IN A MIRRORED ENVIRONMENT

BACKGROUND OF THE INVENTION

1. Field of the Invention

This invention relates in general to data storage systems that use redundant data backup, and more particularly to a method, apparatus and program storage device for allowing continuous availability of data during volume set failures in a mirrored environment.

2. Description of Related Art

Due to advances in computer technology, there has been an ever-increasing need for data storage in data processing networks. In a typical data processing network, there has been an increase in the number of volumes of data storage and an increase in the number of hosts needing access to the volumes.

Fortunately for computer users, the cost of data storage has continued to decrease at a rate approximating the increase in need for storage. For example, economical and reliable data storage in a data network can be provided by a storage subsystem. However, as people's reliance upon machine readable data increases, they are more vulnerable to damage caused by data loss. Large institutional users of data processing systems which maintain large volumes of data such as banks, insurance companies, and stock market traders must and do take tremendous steps to insure back up data availability in case of a major disaster. These institutions recently have developed a heightened awareness of the importance of data recovery and back-up in view of world events. Consequently, data backup systems have never been more important.

Generally, data backup systems copy a designated group of source data, such as a file, volume, storage device, partition, etc. If the source data is lost, applications can use the backup copy instead of the original, source data. The similarity between the backup copy and the source data may vary, depending upon how often the backup copy is updated to match the source data.

Currently, data processing system users often maintaining copies of their valuable data on site on either removable storage media, or in a secondary "mirrored" storage device located on or within the same physical confines of the main storage device. If the backup copy is updated in step with the source data, tile copy is said to be a "mirror" of the source data, and is always "consistent" with the source data. Should a disaster such as fire, flood, or inaccessibility to a building occur, however, both the primary as well as the secondary or backed up data will be unavailable to the user. Accordingly, more data processing system users are requiring tile remote storage of back up data.

Some competing concerns in data backup systems are cost, speed, and data consistency. Systems that guarantee data consistency often cost more, and operate more slowly. On the other hand, many faster backup systems typically cost less while sacrificing absolute consistency. One conventional technique for recovering backup data involves the maintenance of data in "duplex pairs." In a duplex pair configuration, each time data is written on a disk or some other storage media, a duplicate copy is written on a backup disk as well.

One example of a data backup system is the Extended Remote Copy ("XRC") system, sold by International Business Machines Corp ("IBM"). In addition to the usual primary and secondary storage devices, the XRC system uses a "data mover" machine coupled between primary and secondary devices. The data mover performs backup operations by copying data from the primary devices to the secondary devices. Storage operation in the XRC system are "asynchronous," since primary storage operations are committed to primary storage without regard for whether the corresponding data has been stored in secondary storage.

The secondary devices are guaranteed to be consistent with the state of the primary devices at some specific time in the past. This is because the XRC system time stamps data updates stored in the primary devices, enabling the secondary devices to implement the updates in the same order. Time stamping in the XRC system is done with a tinter that is shared among all hosts coupled to primary storage. Since the secondary devices are always consistent with a past state of the primary devices, a limited amount of data is lost if the primary devices fail.

A different data backup system is IBM's Peer-to-Peer Remote Copy ("PPRC") system. The PPRC approach does not use a data mover machine. Instead, storage controllers of primary storage devices are coupled to controllers of counterpart secondary devices by suitable communications links, such as fiber optic cables. The primary storage devices send updates to their corresponding secondary controllers. With PPRC, a data storage operation does not succeed until updates to both primary and secondary devices complete. In contrast to the asynchronous XRC system, PPRC performs "synchronous" backups.

In many backup systems, recovery involves a common sequence of operations. First, backup data is used to restore user data to a known state, as of a known date and time. Next, "updates" to the primary storage subsystem that have not been transferred to the secondary storage subsystem are copied from the "log" where they are stored at the primary storage subsystem, and applied to the restored data. The logged updates represent data received after the last backup was made to the secondary storage subsystem, and are usually stored in the same chronological order according to when they were received by the primary storage subsystem. After applying the logged updates, the data is considered to be restored, and the user's application program is permitted to access the restored data.

Although many of the foregoing technologies constitute significant advances, and may even enjoy significant commercial success today, engineers are continually seeking to improve the performance and efficiency of today's data backup systems. One area of possible focus concerns remote mirroring. Remote mirroring provides a large amount of additional data protection above and beyond what is available in a standard RAID configuration. This includes remote copies of a user's data that can be used at a later point to recover from certain types of failures, including complete loss of a controller pair. The problem with these recovery scenarios is that the user does not have access to their data at the site that is being recovered until the recovery is complete. This can be a large period of time during which the operations are running at the remote site.

One of the more common failures in an array is the loss of a physical drive due to some sort of drive failure. Once a single drive has been lost, it then opens up the array to potential data loss in the event of a second drive failure This window of time for a potential data loss continues to grow as drives increase in size. Currently, in the event of a failure, the user must fail the host systems over to start using the hosts attached to the remote mirror controllers. However, this is a disruption of the data center and may have performance and other unintended consequences. Thus, all of the data must be restored to the failed volume set before any access is allowed to those volume sets by the hosts.

It can be seen then that there a need for a method, apparatus and program storage device that allows the primary array to continue to service host I/O requests even while the volume set of the primary array has been marked OFFLINE.

It can also be seen that there is a need for a method, apparatus and program storage device for allowing continuous availability of data during volume set failures in a mirrored environment.

SUMMARY OF THE INVENTION

To overcome the limitations in the prior art described above, and to overcome other limitations that will become apparent upon reading and understanding the present specification, the present invention discloses a method, apparatus and program storage device for allowing continuous availability of data during volume set failures in a mirrored environment.

The present invention solves the above-described problems by providing continuous servicing of input/output request for a volume set having failed on a primary array using either portions of the failed volume set or a mirrored volume set.

A program storage device readable by a computer embodying one or more programs of instructions executable by the computer to perform a method that includes experiencing failed volume set when a drive fails on a first storage subsystem, receiving an input/output request from a host for the failed volume set associated with the failed drive on the first storage subsystem, determining whether the failed volume set can service the input/output request and providing continuous data availability by using the failed volume set to process the input/output request when the failed volume set can service the input/output request, else using a remote mirrored volume set to process the input/output request.

In another embodiment of the present invention, a data storage system is provided. The data storage system includes a controller for controlling access to a volume set, the controller being configured for receiving an input/output request for a volume set associated with a failed drive on a storage system, for determining whether the failed volume set can service the input/output request and for providing continuous data availability by using the failed volume set to process the input/output request when the failed volume set can service the input/output request, else using a remote mirrored volume set to process the input/output request.

In another embodiment of the present invention, a data processing apparatus is provided. The data processing apparatus includes a memory comprising executable instructions for performing a method allowing continuous availability of data during volume set failures in a mirrored environment and a processor for executing instruction provided from the memory, wherein the processor is configured by the executable instructions from the memory to receive an input/request for a volume set associated with a failed drive on a first storage system, to determines whether tile failed volume set can service the input/output request and to provide continuous data availability by using the failed volume set to process the input/output request when the failed volume set can service the input/output request, else using a remote mirrored volume set to process the input/output request.

In another embodiment of the present invention, a method for allowing continuous availability of data during volume set failures in a mirrored environment is provided. The method includes experiencing failed volume set when a drive fails on a first storage subsystem, receiving an input/output request from a host for the failed volume set associated with the failed drive on the first storage subsystem, determining whether the failed volume set can service the input/output request and providing continuous data availability by using the failed volume set to process the input/output request when the failed volume set can service the input/output request, else using a remote mirrored volume set to process the input/output request.

In another embodiment of the present invention, another data storage system is provided. This data storage system includes means for controlling access to a volume set, the means for controlling being configured for receiving an input/output request for a volume set associated with a failed drive, for determining whether the failed volume set can service the input/output request and for providing continuous data availability by using the failed volume set to process the input/output request when the failed volume set can service the input/output request, else using a remote mirrored volume set to process the input/output request.

In another embodiment of the present invention, another data processing apparatus is provided. This data processing apparatus includes means for providing memory having executable instructions for performing a method allowing continuous availability of data during volume set failures in a mirrored environment and processing means, coupled to the means for providing memory, for executing instruction provided from the memory, wherein the means for processing is configured to perform the executable instructions from the memory to receive an input/request for a volume set associated with a failed drive on a first storage means, to determines whether the failed volume set can service the input/output request and to provide continuous data availability by using the failed volume set to process the input/output request when the failed volume set can service the input/output request, else using a remote mirrored volume set to process the input/output request.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method, apparatus and program storage device for allowing continuous availability of data during volume set failures in a mirrored environment. The present invention provides Continuous servicing of input/output request for a volume set having failed on a primary array using either portions of the failed volume set or a mirrored volume set.

Figure 1:
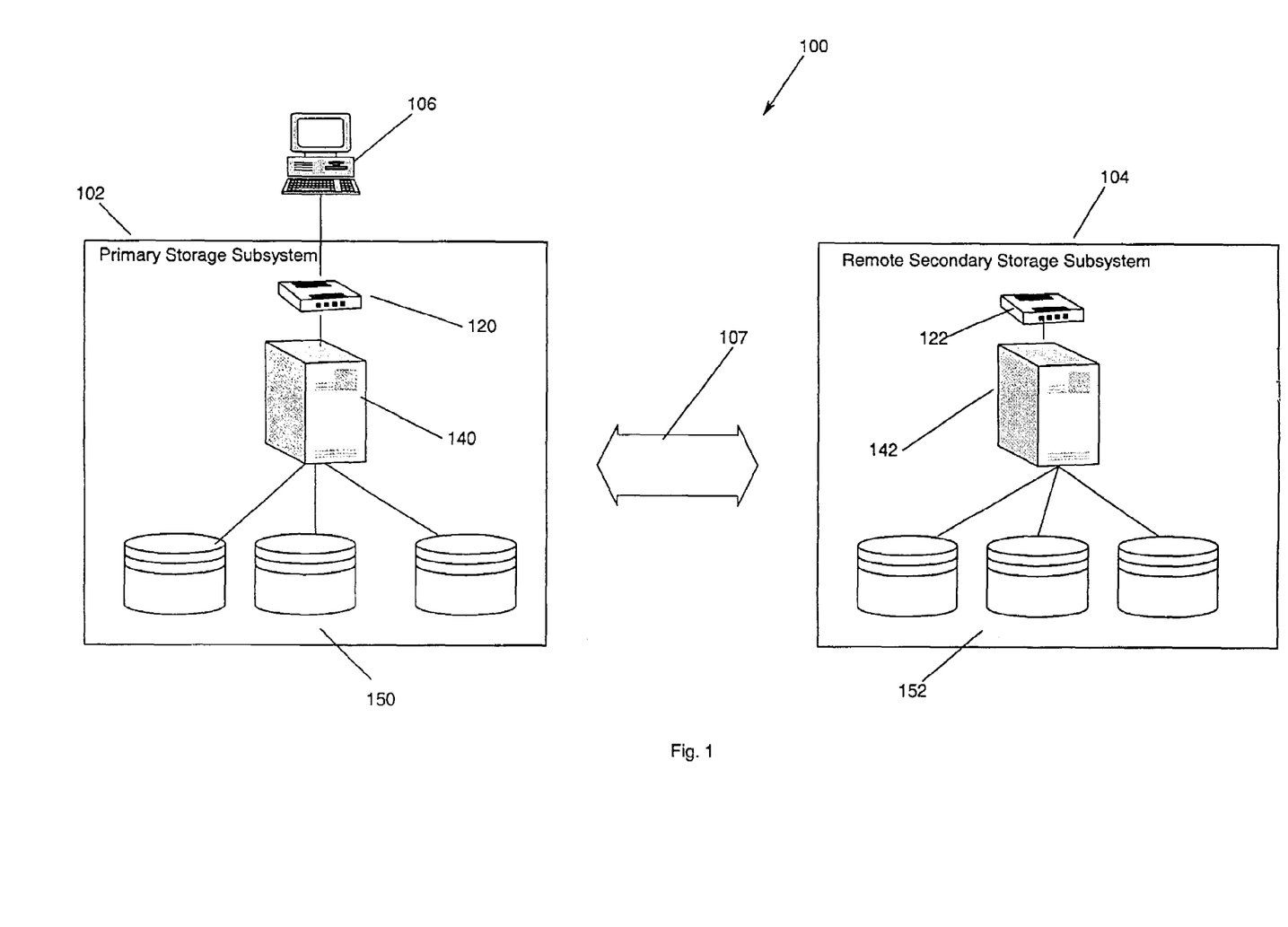
FIG. 1 illustrates one example of a data storage system according to the present invention.

FIG. 1 illustrates one example of a data storage system 100 according to the present invention. The system 100 includes a primary data storage subsystem 102 and a remote secondary data storage subsystem 104. The primary storage subsystem 102 is coupled to one or more hosts, as illustrated by the host 106, via a controller 120. For example, controller 120 may be a RAID controller (Redundant Arrays of Inexpensive (or Independent) Disks). A RAID controller provides increased capacity and reliability using multiple smaller storage modules configured in geometries that permit redundancy of stored data to assure data integrity in case of various failures. The RAID controller shields the user or host system from the details of managing the redundant array. Nevertheless, those skilled in the art will recognize that controller 120 is not limited to a RAID controller, but may be a data processing device configured in any manner according to the present invention.

The storage subsystems 102, 104 are coupled by a link 107 for use in copying updates from the primary storage subsystem 102 to the remote secondary storage subsystem 104. Remote secondary storage subsystem 104 may include its own controller 122.

As illustrated, the primary storage subsystem 102 is coupled to a host 106, which comprises one or more personal computers, mainframe computers, computer workstations, computer networks, manually operated data input devices, modem, scanner, or other source of data. Broadly, the host 106 sends data to the primary storage subsystem 102 for storage therein. For ease of reference, data is used to include data that is new to the storage subsystem 102, additions to existing data stored on the storage subsystem 102, changes to existing data, deletions, etc. Ultimately, the data that has been committed to the primary storage subsystem 102 is copied to counterpart storage devices in the remote secondary storage subsystem 104.

Primary data storage subsystem 102 and remote secondary data storage subsystem 104 may include a server 140, 142 as well as an array 150, 152. However, the present invention is not meant to be limited to any particular data storage configuration. The present invention also contemplates a number of other data storage arrangements, which should be apparent to those of ordinary skill in the art with the benefit of this disclosure. As an example, the storage system may include multiple primary storage subsystems and multiple remote secondary storage subsystems. In this arrangement, each primary storage subsystem may be coupled to one or more hosts, where these hosts may (or may not) be attached to other primary storage subsystems.

The primary storage subsystem's controller 120 may be implemented in different forms, including a microprocessor or other digital data processing apparatus. This apparatus may be embodied by various hardware components and interconnections. Further, the primary data storage subsystem 102 and remote secondary data storage subsystem 104 may include a digital data processing apparatus. Those skilled in the art will recognize that the designation of primary and remote secondary are used for clarification only and that a volume set on remote data storage subsystem is in effect mirrored by the volume set on the primary data storage subsystem. Thus, the present invention, as will be described herein, could operate in reverse fashion.

Figure 2:
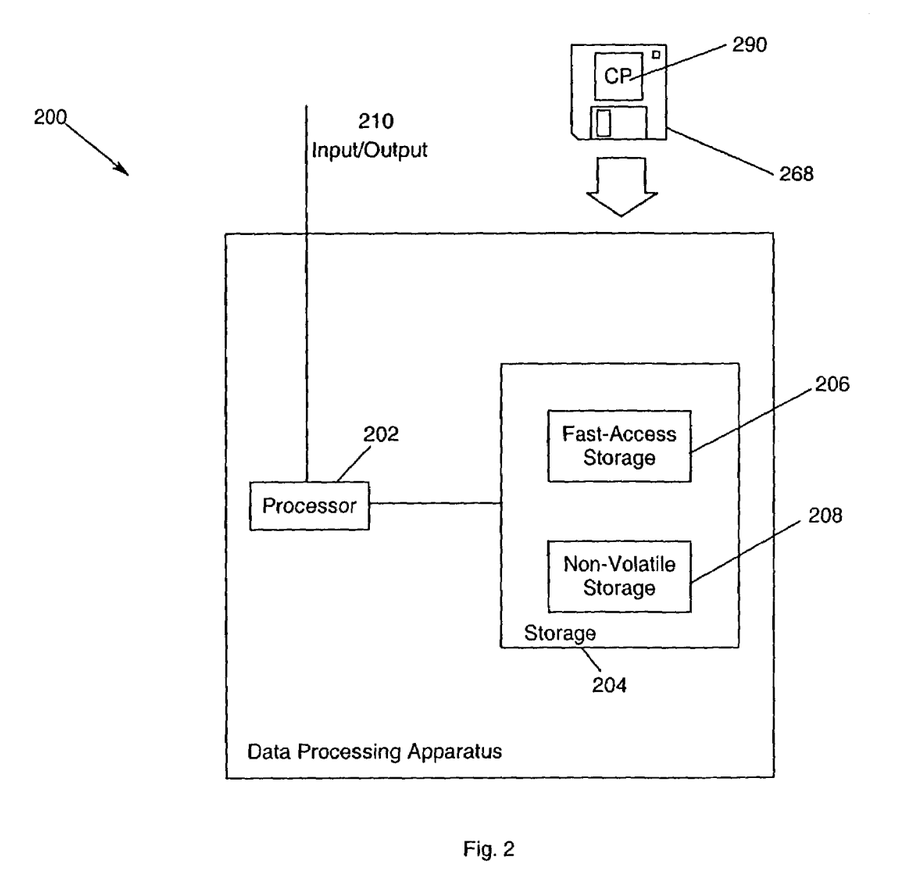
FIG. 2 illustrates a data processing apparatus according to the present invention.

FIG. 2 illustrates a data processing apparatus 200 according to the present invention. The apparatus 200 includes a processor 202, such as a microprocessor or other processing machine, coupled to storage 204. Tile apparatus 200 also includes an input/output 210, such as a line, bus, cable, electromagnetic link, or other means for the processor 202 to exchange data with other hardware external to the apparatus 200, e.g., a host or storage array.

In the present example, the storage 204 includes a fast-access storage 206, as well as nonvolatile storage 208. The fast-access storage 206 may comprise random access memory ("RAM"), and may be used to store programming instructions executed by the processor 202. Moreover, fast-access storage 206 may also provide cache memory that is mapped to storage blocks on a disk array.

The data processing apparatus 200 may be, for example, a RAID controller. A RAID controller provides control for multiple smaller storage modules configured in geometries that permit redundancy of stored data to assure data integrity in case of various failures. A RAID controller shields the user or host system from the details of managing the redundant array. Mapping provided by the fast-access storage 206, e.g., cache memory, is transparent to the host system. The host system simply requests blocks of data to be read or written and the RAID controller manipulates the disk array and cache memory as required.

Nevertheless, the present is not limited to a RAID controller. Furthermore, despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

In contrast to tile digital data storage apparatus 200 discussed above, a different embodiment of the invention may use logic circuitry instead of computer-executed instructions to implement the controller 120. Depending upon the particular requirements of the application in the areas of speed, expense, tooling costs, and the like, this logic may be implemented by constructing an application-specific integrated circuit ("ASIC"). Other alternatives include a digital signal processing chip ("DSIP"), discrete circuitry (such as resistors, capacitors, diodes, inductors, and transistors), field programmable gate array ("FPGA"), programmable logic array ("PLA"), and the like.

Once a volume set has been marked OFFLINE there is no way to reconstruct the data on that array. The data must instead be rewritten to the volume set from some backup source. The problem with this technique is that the volume set being reconstructed is unavailable during the rewriting of the data. Instead, a more desirable solution would be to be able to obtain any data needed to service host I/O requests from the backup source while the regeneration of the primary volume set is in progress. Since the backup volume set in a remote mirror is a random access device, this type of operation is possible with the correct controls.

Figure 3:
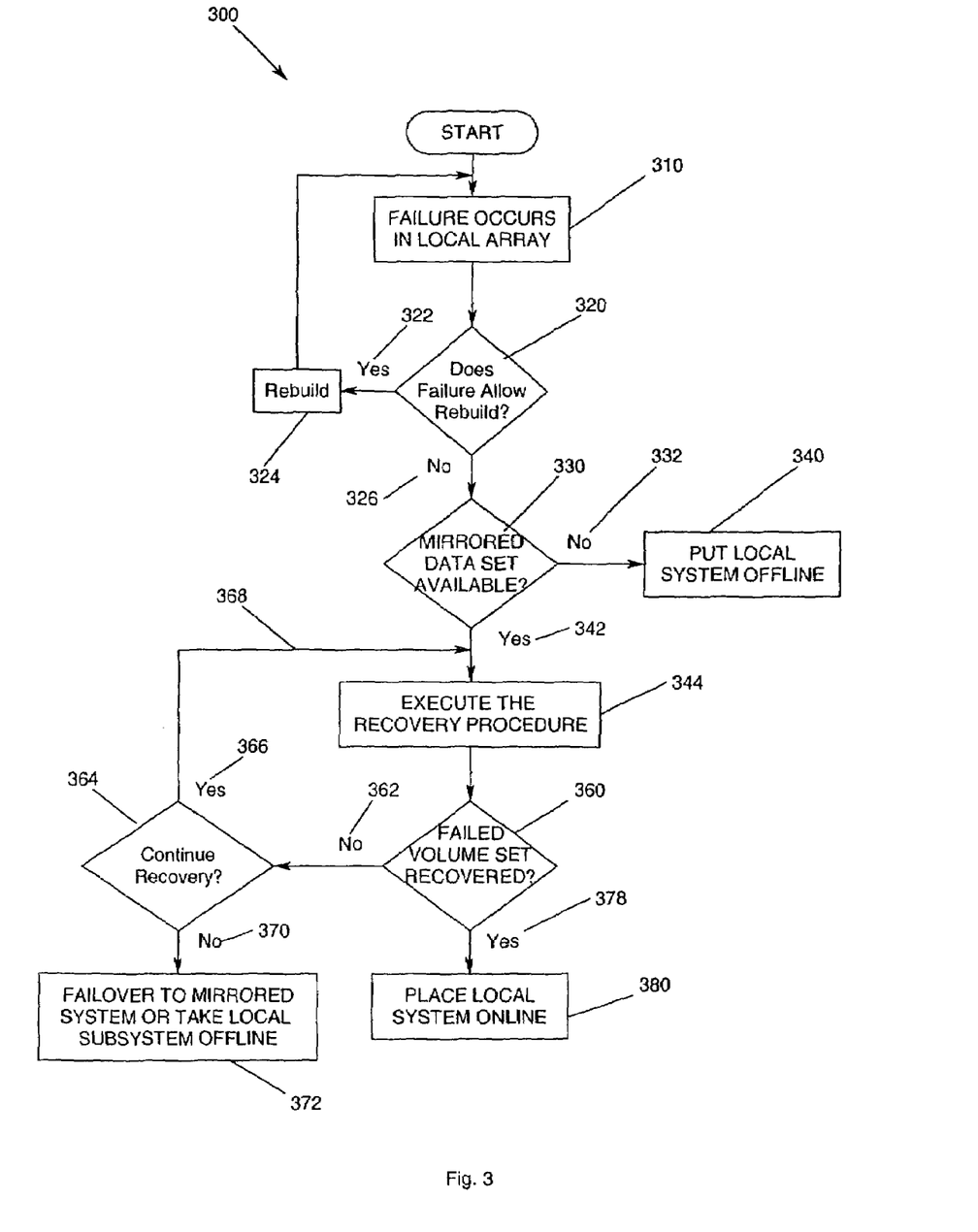
FIG. 3 illustrates a flow chart of the recovery process according to the present invention.

FIG. 3 illustrates a flow chart of the recovery process 300 according to the present invention. During operation, a failure occurs in a local array 310. A determination is made whether the failure allows a rebuild 320. In today's system it is assumed that there are multiple standby drives available to replace a failed drive in a storage array and a rebuild of the data is possible 322. Thus, when tile first drive fails in an array, a spare drive will be chosen and will replace the failed drive, and then a rebuild will begin 324. However, in tile event of a failure, a rebuild may not be a viable option 326. For example, if a second drive fails during the rebuild process, or prior to the rebuild starting (possibly due to a shelf of drives failing or another system wide failure), a rebuild may not be feasible. In this instance, to avoid being placed OFFLINE, the storage system must have a mirrored data set. Thus, a determination is made whether a mirrored data set is available 330. When the second drive in the volume set fails and the failed array does not have a mirror associated with it 332, the volume set will be marked OFFLINE and all of its data is lost 340.

If the failed array has a mirror volume set associated with it 342, the failed array will execute a recovery procedure 344 according to the present invention. This can continue until the failed volume has been recovered. A determination is made whether the volume has been recovered 360. If not 362, a decision is made whether to continue the recovery process 364. If yes 366, the recovery process continues 368. If not 370, the user either fails the host systems over to using the mirror controller or the user intervenes and moves the array to an OFFLINE state 372 (this terminates the mirror relationship). If sufficient spare drives exist in the storage subsystem to replace the failed ones or the user intervenes and replaces the failed drives with working drives, the array may recover the volume set. Once the volume set has been recovered 378, the volume set is placed ONLINE again 380.

Figure 4:
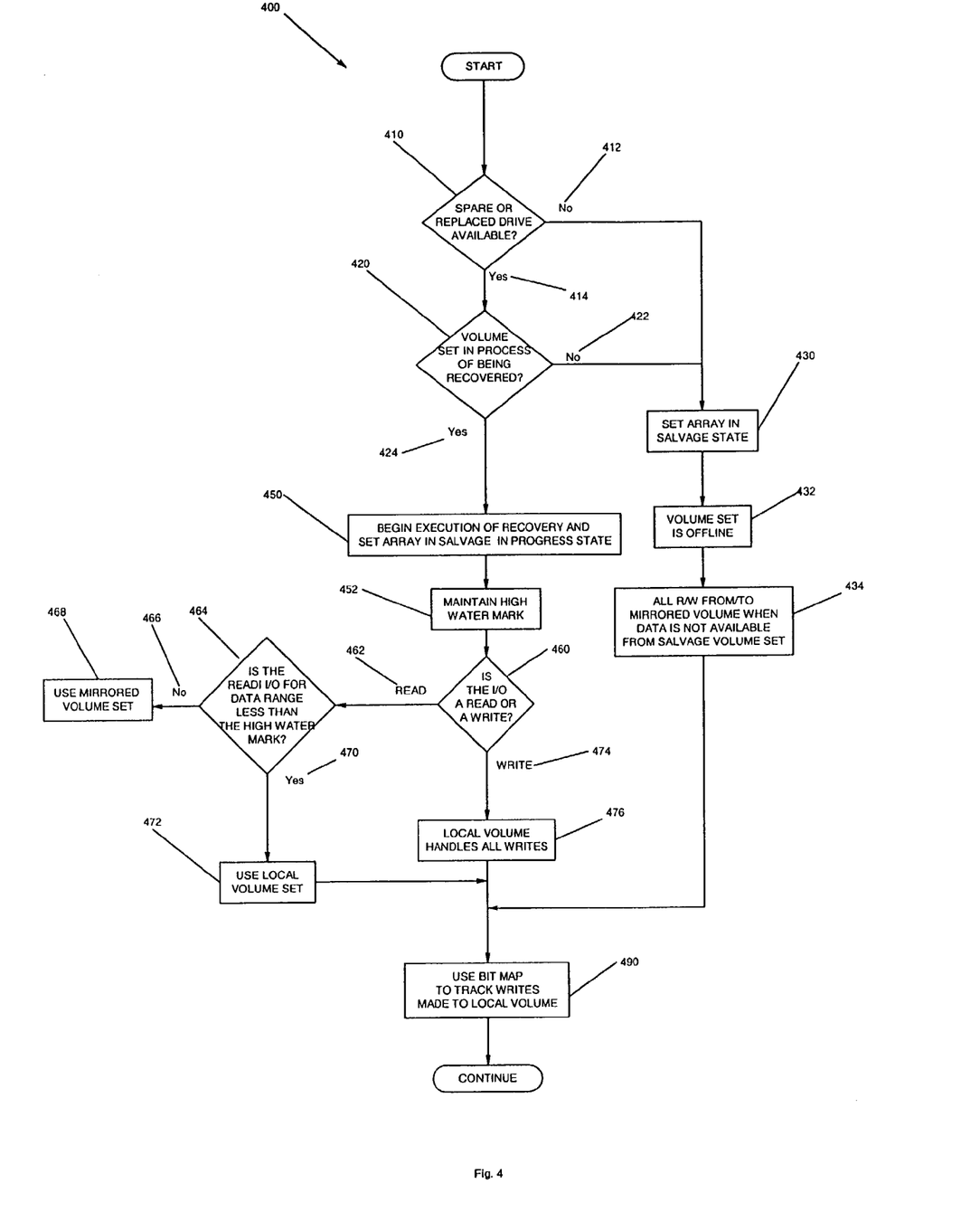
FIG. 4 is a flow chart illustrating a method for allowing continuous availability of data during volume set failures in a mirrored environment according to the present invention.

FIG. 4 is a flow chart illustrating a method for allowing continuous availability of data during volume set failures in a mirrored environment according to the present invention. A decision is made whether a spare drive is or replaced drive is available 410. If not 412, the failed volume set will be placed in SALVAGE state 430. If so 414, a determination is made whether the volume recovery process has begun 420. If not 422, the failed volume set will also be placed in SALVAGE state 430. When the failed volume set is placed in the SALVAGE state 430, the failed volume is placed OFFLINE 432 and I/O requests from the host can still be serviced by the mirror volume set if the data is not available on the SALVAGE volume set 434. The SALVAGE state thus allows any host commands to be forwarded to the mirror volume set's controller where they will be processed. All host write data may be written to the mirror system and host read data may be brought in from the mirror system. However, read requests should be serviced from the drive in the SALVAGE state if possible. The remote mirrored volume set should only be used if necessary (certain drives, those which have not failed, will still have valid data on them). Write requests should be written to the SALVAGE drive if the physical disk required could be written, i.e., writing to drives that have not failed. Parity Drives ate not written. Writes to the remote mirror volume set can be handled either synchronously or asynchronously. This allows a large number of the host I/O requests to be serviced in a timely manner, without incurring the potential delay of communications with the mirror partner.

A write bitmap is used to track writes made to the local volume 490. The write bitmap allows host writes to go directly to the volume set that is being recovered. This is used so that the data will not need to be copied over from the mirror volume set. The data is copied to the both the mirror volume set and the volume set being recovered since the system is still operating in mirrored mode. This bitmap is used to minimize the work the data recovery process needs to perform.

If sufficient spare drives exist in the RAID Subsystem are available to replace the failed ones or the user intervenes and replaces the failed drives with working drives 424, the array will be placed into a SALVAGE IN PROGRESS state and the recovery process will begin execution 450. The SALVAGE IN PROGRESS state indicates that the failed array has a full complement of physical drives and is in the process of being brought ONLINE. To bring the drive ONLINE, all of the data that exists on the mirror must be copied to the fail volume set. Once all of the data is copied to the failed volume set, the recovered volume set is moved to the ONLINE state and host I/O processing returns to how it was prior to the drive failures.

The SALVAGE IN PROGRESS starts a background copy (data recovery) process which copies data from the mirror volume set to the volume set which is being recovered. The last location of data that was recovered is marked by a high water mark 452. A determination is made whether the I/O request is a read or write request 460. If a read request 462, a determination is made whether the read host I/O is less than the high water mark 464. If the request spans the high water mark or is greater than the high water mark 466, the mirror volume will service it 468, as during the SALVAGE state. If less than the high water mark 470, the read host I/O is serviced by the local volume (the one being recovered) 472. Any data with a logical block address (LBA) that is less than the high water mark is considered valid on the SALVAGE IN PROGRESS volume.

For a write host I/O 474, the local volume set which is being recovered services the write host I/O 476. Again, to keep track of what data has been written to the volume set that is being recovered, a write bitmap is managed 490. Thus, any write is recorded, and the data will not be copied over by the data recovery process.

Specific reads, i.e., those which fall onto drives in the volume set which did not fail, will continue to be handled as during the SALVAGE state 430. The background process copies data from the mirror volume set to the SALVAGE IN PROGRESS volume set. This is referred to as the data recovery process. Forwarding/receiving processes can send host write I/Os and read I/Os to the mirror controller. This includes sending the host data and receiving the host data from the mirror controller volume set.

FIG. 2 illustrates the data processing apparatus 200 according to the present invention, wherein the process illustrated with reference to FIGS. 3-4 may be tangibly embodied in a computer-readable medium or carrier, e.g. one or more of the fixed and/or removable data storage devices 268 illustrated in FIG. 2, or other data storage or data communications devices. A computer program 290 expressing the processes embodied on the removable data storage devices 268 may be loaded into the storage 204 or into the processor 202 to configure the data processing apparatus 200 of FIG. 2, for execution. The computer program 290 comprise instructions which, when read and executed by the data processing apparatus 200 of FIG. 2, causes the data processing apparatus 200 to perform the steps necessary to execute the steps or elements of the present invention The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A program storage device readable by a computer and tangibly embodying one or more programs of instructions executable by the computer to provide continuous availability of data during volume set failures in a mirrored environment by:

experiencing a failed volume set when a drive fails on a first storage subsystem;

initiating regeneration of the failed volume set after detecting failure of a drive on the first storage subsystem;

receiving an input/output request from a host for the failed volume set associated with the failed drive on the first storage subsystem during regeneration of the failed volume set;

determining whether the failed volume set during regeneration of the failed volume set can service the input/output request directly; and providing continuous data availability by using the failed volume set to process the input/output request during regeneration of the failed volume set when the failed volume set can service the input/output request, else using a remote mirrored volume set to process the input/output request.

2. The program storage device of claim 1, wherein the initiating regeneration of the failed volume set further comprises restoring the failed volume set with the mirrored volume set on a second storage subsystem when a working drive is available to replace the failed drive.

3. The program storage device of claim 2 wherein the working drive is a spare drive.

4. The program storage device of claim 2 wherein the working drive is a new drive replacing the failed drive.

5. The program storage device of claim 2 wherein a last location of data restored for the failed volume set is indicated by a marker.

6. The program storage device of claim 5 wherein the input/output request is a read request and wherein the failed volume set can service the read request when the data range for the read request is less than the location indicated by the marker.

7. The program storage device of claim 2 wherein the input/output request is a read request and wherein the failed volume set can service the read request when the read request is for data on a drive on the first storage subsystem that did not fail.

8. The program storage device of claim 1 wherein the input/output request is a write request.

9. The program storage device of claim 8 wherein the write request is made to a failed volume set being restored on the first storage subsystem.

10. The program storage device of claim 9 further comprising mapping the write to the failed volume set being restored.

11. The program storage device of claim 10 wherein the mapping further comprises a write bit map.

12. A data storage system, comprising:

a controller for controlling access to a volume set, the controller being configured for detecting failure of a drive on a first storage subsystem resulting in a failed volume set, for initiating regeneration of the failed volume set after detecting failure of a drive on the first storage subsystem, for receiving an input/output request from a host for the failed volume set associated with a failed drive on the first storage subsystem during regeneration of the failed volume set, for determining whether the failed volume set during regeneration of the failed volume set can service the input/output request directly and for providing continuous data availability by using the failed volume set to process the input/output request during regeneration of the failed volume set when the failed volume set can service the input/output request, else using a remote mirrored volume set to process the input/output request.

13. The data storage system of claim 12 wherein the controller is further configured for initiating regeneration of the failed volume set after detecting failure of a drive on the first storage subsystem by restoring the failed volume set with the mirrored volume set when a working drive is available to replace the failed drive.

14. The data storage system of claim 13 wherein the working drive is a spare drive.

15. The data storage system of claim 13 wherein the working drive is a new drive replacing the failed drive.

16. The data storage system of claim 13 further comprising a marker indicating a last location of data restored for the failed volume set.

17. The data storage system of claim 16 wherein the input/output request is a read request and wherein the controller services the read request using the failed volume set when the data range for the read request is less than the location indicated by the marker.

18. The data storage system of claim 13 wherein the input/output request is a read request and wherein the controller services the read request when the read request is for data on a drive that did not fail.

19. The data storage system of claim 12 wherein the input/output request is a write request.

20. The data storage system of claim 19 wherein the write request is made to a failed volume set being restored.

21. The data storage system of claim 20 further comprising a write bit map mapping the write to the failed volume set being restored.

22. A data processing apparatus, comprising:

a memory comprising executable instructions for performing a method allowing continuous availability of data during volume set failures in a mirrored environment; and a processor for executing instruction provided from the memory;

wherein the processor is configured by the executable instructions from the memory to detect failure of a drive on a first storage subsystem resulting in a failed volume set, to initiate regeneration of the failed volume set after detecting failure of a drive on the first storage subsystem, to receive an input/request for a volume set associated with a failed drive on a first storage system during regeneration of the failed volume set, to determines whether the failed volume set during regeneration of the failed volume set can service the input/output request directly and to provide continuous data availability by using the failed volume set to process the input/output request during regeneration of the failed volume set when the failed volume set can service the input/output request, else using a remote mirrored volume set to process the input/output request.

23. A method for allowing continuous availability of data during volume set failures in a mirrored environment, the method comprising:
   experiencing a failed volume set when a drive fails on a first storage subsystem;
   initiating regeneration of the failed volume set after detecting failure of a drive on the first storage subsystem;
   receiving an input/output request from a host for the failed volume set associated with the failed drive on the first storage subsystem during regeneration of the failed volume set;
   determining whether the failed volume set during regeneration of the failed volume set can service the input/output request directly; and
   providing continuous data availability by using the failed volume set to process the input/output request during regeneration of the failed volume set when the failed volume set can service the input/output request, else using a remote mirrored volume set to process the input/output request.

24. The method of claim 23, wherein the initiating regeneration of the failed volume set further comprises restoring the failed volume set with the mirrored volume set on a second storage subsystem when a working drive is available to replace the failed drive.

25. The method of claim 23 wherein the input/output request is a write request, and wherein the write request is made to a failed volume set being restored on the first storage subsystem.

26. The method of claim 23 further comprising mapping a write to the failed volume set being restored.

27. The method of claim 26 wherein the mapping further comprises a write bit map.

28. A data storage system, comprising:
   means for controlling access to a volume set, the means for controlling being configured for detecting failure of a drive on a first storage subsystem resulting in a failed volume set, for initiating regeneration of the failed volume set after detecting failure of a drive on the first storage subsystem, for receiving an input/output request from a host for the failed volume set associated with a failed drive on the first storage subsystem during regeneration of the failed volume set, for determining whether the failed volume set during regeneration of the failed volume set can service the input/output request directly and for providing continuous data availability by using the failed volume set to process the input/output request during regeneration of the failed volume set when the failed volume set can service the input/output request, else using a remote mirrored volume set to process the input/output request.

29. A data processing apparatus, comprising:
   means for providing memory having executable instructions for performing a method allowing continuous availability of data during volume set failures in a mirrored environment; and
   processing means, coupled to the means for providing memory, for executing instruction provided from the memory;
   wherein the means for processing is configured to perform the executable instructions from the memory to detect failure of a drive on a first storage subsystem resulting in a failed volume set, to initiate regeneration of the failed volume set after detecting failure of a drive on the first storage subsystem, to receive an input/request for a volume set associated with a failed drive on a first storage system during regeneration of the failed volume set, to determines whether the failed volume set during regeneration of the failed volume set can service the input/output request directly and to provide continuous data availability by using the failed volume set to process the input/output request during regeneration of the failed volume set when the failed volume set can service the input/output request, else using a remote mirrored volume set to process the input/output request.

* * * * *